(12) United States Patent
Funayama

(10) Patent No.: US 12,021,862 B2
(45) Date of Patent: Jun. 25, 2024

(54) INFORMATION PROCESSING DEVICE, CONTROL METHOD FOR INFORMATION PROCESSING DEVICE, AND RECORDING MEDIUM

(71) Applicant: CANON KABUSHIKI KAISHA, Tokyo (JP)

(72) Inventor: Hirotaka Funayama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 317 days.

(21) Appl. No.: 17/504,751

(22) Filed: Oct. 19, 2021

(65) Prior Publication Data

US 2022/0131855 A1 Apr. 28, 2022

(30) Foreign Application Priority Data

Oct. 28, 2020 (JP) .................... 2020-180768

(51) Int. Cl.
*H04L 9/40* (2022.01)
*G06F 21/32* (2013.01)
(Continued)

(52) U.S. Cl.
CPC .......... *H04L 63/0853* (2013.01); *G06F 21/32* (2013.01); *G06F 21/34* (2013.01);
(Continued)

(58) Field of Classification Search
CPC ............. H04L 63/0853; H04L 63/0861; H04L 63/126; H04L 9/3247; H04L 9/3231; G06F 21/32; G06F 21/34; G06F 2221/2103
See application file for complete search history.

(56) References Cited

U.S. PATENT DOCUMENTS

| | | | | |
|---|---|---|---|---|
| 8,448,225 B2 * | 5/2013 | Kijima | .................... | G06F 21/31 726/28 |
| 2013/0182279 A1 * | 7/2013 | Yano | ..................... | G06F 21/608 358/1.14 |

(Continued)

FOREIGN PATENT DOCUMENTS

JP 2012069025 A 4/2012

OTHER PUBLICATIONS

Coauthentication, by Cetin et al., published 2019 (Year: 2019).*

*Primary Examiner* — Vu V Tran
(74) *Attorney, Agent, or Firm* — VENABLE LLP

(57) ABSTRACT

An information processing device includes a display control means that displays a log-in screen for a service which is provided by a collaboration service after accessing the collaboration service, a first transmission means that transmits a request for verification data to the collaboration service, a communication control means that communicates with an authenticator before authenticating a user, a second transmission means that transmits a request including verification data to the authenticator when an instruction for log-in is received, and a third transmission means that transmits signature data received from the authenticator to the collaboration service. At least one of transmission of the request to the collaboration service from the first transmission means and communication of the communication control means with the authenticator is performed without waiting until the instruction for log-in is received from the user after accessing the collaboration service.

11 Claims, 8 Drawing Sheets

(51) Int. Cl.
  *G06F 21/34* (2013.01)
  *H04L 9/32* (2006.01)
(52) U.S. Cl.
  CPC ........ *H04L 9/3247* (2013.01); *H04L 63/0861* (2013.01); *G06F 2221/2103* (2013.01)

(56) References Cited

U.S. PATENT DOCUMENTS

2015/0200926 A1* 7/2015 Fukuda ............... H04L 63/0815
  726/5
2017/0041504 A1* 2/2017 Fukuda ............... H04L 63/0807
2017/0245145 A1* 8/2017 Choi .................... H04W 76/14
2020/0366676 A1* 11/2020 Sekiya .................. G06Q 40/03

* cited by examiner

INFORMATION PROCESSING DEVICE, CONTROL METHOD FOR INFORMATION PROCESSING DEVICE, AND RECORDING MEDIUM

This application claims the benefit of Japanese Patent Application No. 2020-180768, filed Oct. 28, 2020, which is hereby incorporated by reference wherein in its entirety.

BACKGROUND OF THE INVENTION

Field of the Invention

The present invention relates to an information processing device, a method, and a recording medium. The present invention relates to a system for shortening a time associated with biometric authentication by asynchronously acquiring information required for biometric authentication from a server before a user inputs a biometric authentication request and acquiring a list of authenticators available in advance.

Description of the Related Art

Recently, fast identity online (abbreviated to FIDO) has attracted attention as a new authentication system including biometric authentication. Regarding biometric information such as a fingerprint or veins which is used for biometric authentication, since the information cannot be rewritten when the information leaks externally unlike a password in ID/password authentication, information leakage is fatal. On the other hand, FIDO does not perform an authentication operation in a server via the Internet, but performs the authentication operation in a terminal carried by a user. Accordingly, with FIDO, biometric information is not able to leak to a network and a risk of information leakage is small. Japanese Unexamined Patent Application Publication No. 2012-69025 discloses a biometric authentication system that stores biometric information in a biometric authentication server and that reduces a load of the biometric authentication server by caching users' biometric information belonging to a specific group on a client side.

However, when a client side takes charge of an authentication process as described in Japanese Unexamined Patent Application Publication No. 2012-69025, an authentication result may be disguised by a malicious client and thus there is a risk to security. The configuration in which a client side takes charge of the authentication process as described in Japanese Unexamined Patent Application Publication No. 2012-69025 cannot also be applied to an authentication mechanism of FIDO in which a server side performs signature verification. When authentication for log-in to a collaboration service is performed using biometric authentication and parameters required for biometric authentication are acquired from the collaboration service or a process of identifying an available authenticator is performed after a user has requested log-in, time is required for a biometric authentication flow, which decreases usability.

SUMMARY OF THE INVENTION

The present invention is for shortening a time required for an authentication process when authentication of a user is performed using an external authenticator.

According to the invention, there is provided an information processing device that is able to communicate with an external authenticator that authenticates a user, the information processing device including: at least one memory storing instructions: and one or more processors configured to execute the instructions, which when executed by the one or more processors, cause the information processing device to: display a screen for receiving an instruction for log-in to a service which is provided by a service provider system from the user after accessing the service provider system; transmit an acquisition request for verification data to the service provider system; communicate with the external authenticator before authenticating the user; transmit a request including the verification data to the communicating external authenticator when the instruction for log-in is received from the user via the screen; and transmit signature data, which is prepared using a private key which is identified when the process of authenticating the user has succeeded and the verification data, to the service provider system when the signature data is received from the external authenticator, wherein at least one of transmission of the request to the service provider system and communication with the external authenticator is performed without waiting until the instruction for log-in is received from the user via the screen after accessing the service provider system.

Further features of the present invention will become apparent from the following description of exemplary embodiments with reference to the attached drawings.

DESCRIPTION OF THE EMBODIMENTS

First Embodiment

Figure 1:
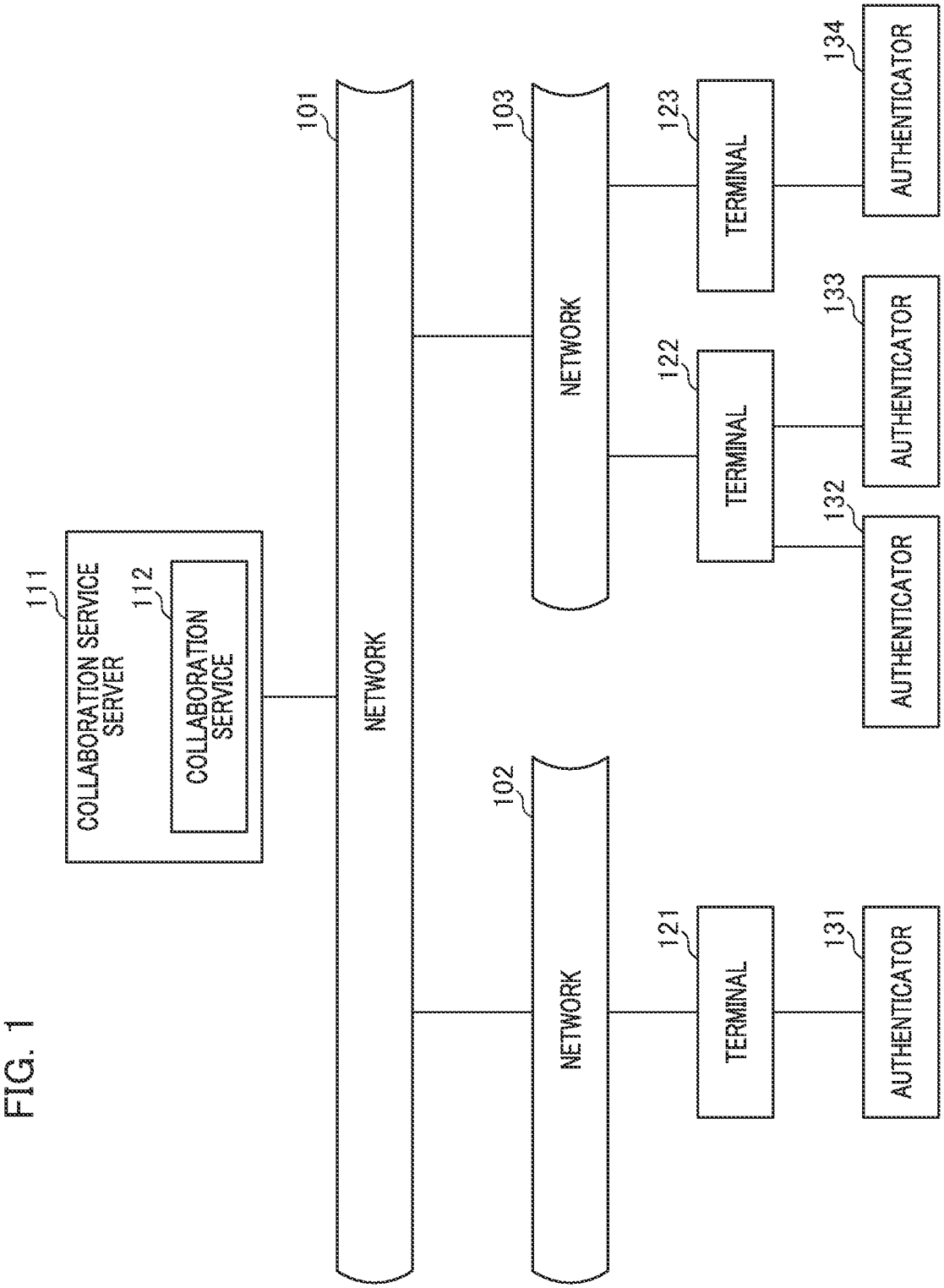
FIG. 1 is a diagram illustrating the entire configuration of a biometric authentication system.

FIG. 1 is a diagram illustrating an example of the entire configuration of a system according to an embodiment of the present invention. The system includes a collaboration service server 111 that provides a collaboration service 112, a plurality of terminals 121 to 123, and authenticators 131 to 134. The collaboration service server 111 and the terminals 121 to 123 are communicatively connected via networks 101 to 103.

The networks 101 to 103 are communication networks through which data can be transmitted and received. The communication networks are realized, for example, by one of a LAN such as the Internet, a WAN, a telephone circuit line, a dedicated digital circuit line, an ATM, a frame relay circuit line, a cable television circuit line, and a radio circuit line for data broadcast or a combination thereof. In this embodiment, it is assumed that the network 101 is the Internet and the networks 102 and 103 are office networks or networks of service providers.

The collaboration service server 111 is an information processing device that provides the collaboration service 112. The collaboration service 112 is an external system that provides a service to the terminals 121 to 123 (a service provider system). The collaboration service 112 provides an application program interface (API) for an application which operates in the terminals 121 to 123. The collaboration service 112 provides contents including a program operating in a Web browser such as JavaScript in response to a request from the Web browser operating in the terminals 121 to 123. The program operating in a browser including JavaScript operates as a Web application using the API which is provided by the collaboration service 112 and provides various functions to users of the terminals 121 to 123. In this embodiment, the collaboration service 112 is provided by the collaboration service server 111, but the invention is not limited thereto. The collaboration service 112 may be realized by a virtual machine (a cloud service) using resources which are provided by a data center including a server device as well as a server device.

The terminals 121 to 123 are information processing devices such as personal computers, mobile phones, and tablet terminals in which program execution environments have been incorporated. An environment in which a Web browser and an application for providing a phone function or the like are executed is incorporated in the terminals 121 to 123. In this embodiment, the terminal 121 is connected to the collaboration service server 111 via the network 101 and the network 102. The terminal 122 and the terminal 123 are connected to the collaboration service server 111 via the network 101 and the network 103. Users of the terminals 121 to 123 (hereinafter referred to as users) have accounts of the collaboration service 112 and can access various functions or data of the collaboration service 112 by logging into the collaboration service 112 with their user IDs. In FIG. 1, three terminals 121 to 123 are connected to the collaboration service server 111 via the networks, but the present invention is not limited thereto and the number of terminals may be one or more. The terminals 121 to 123 can communicate with an authenticator that authenticates a user.

The authenticators 131 to 134 are external authenticators that perform biometric authentication when a user requests authentication for the collaboration service 112. The authenticators 131 to 134 are not particularly limited in types of a dongle, a mobile phone, and the like as long as they have a biometric authentication function. In this embodiment, the authenticator 131 is communicatively connected to the terminal 121. The authenticator 132 and the authenticator 133 are communicatively connected to the terminal 122. The authenticator 134 is communicatively connected to the terminal 123. Each terminal may be connected to a plurality of authenticators and, for example, the terminal 121 may be connected to the authenticators 131 to 134.

The authenticators 131 to 134 may be integrally incorporated into a terminal or may be external devices that are connected to the terminal. The authenticators 131 to 134 connected to the terminals 121 to 123 are connected, for example, using Bluetooth, near-field communication (NFC), or a universal serial bus (USB). The authenticators 131 to 134 may be normally connected to the terminals 121 to 123 or may be connected to the terminals 121 to 123 only at the time of authentication in response to requests therefrom. For example, when Bluetooth is used, a terminal may perform searching using a technique such as Bluetooth Low Energy (BLE) and be connected to the found authenticators 131 to 134. The authenticators 131 to 134 may be started by causing the terminals 121 to 123 to transmit an advertisement packet to the authenticators 131 to 134 which were paired in the past and which are powered off and the terminals may be connected thereto.

Figure 2A:
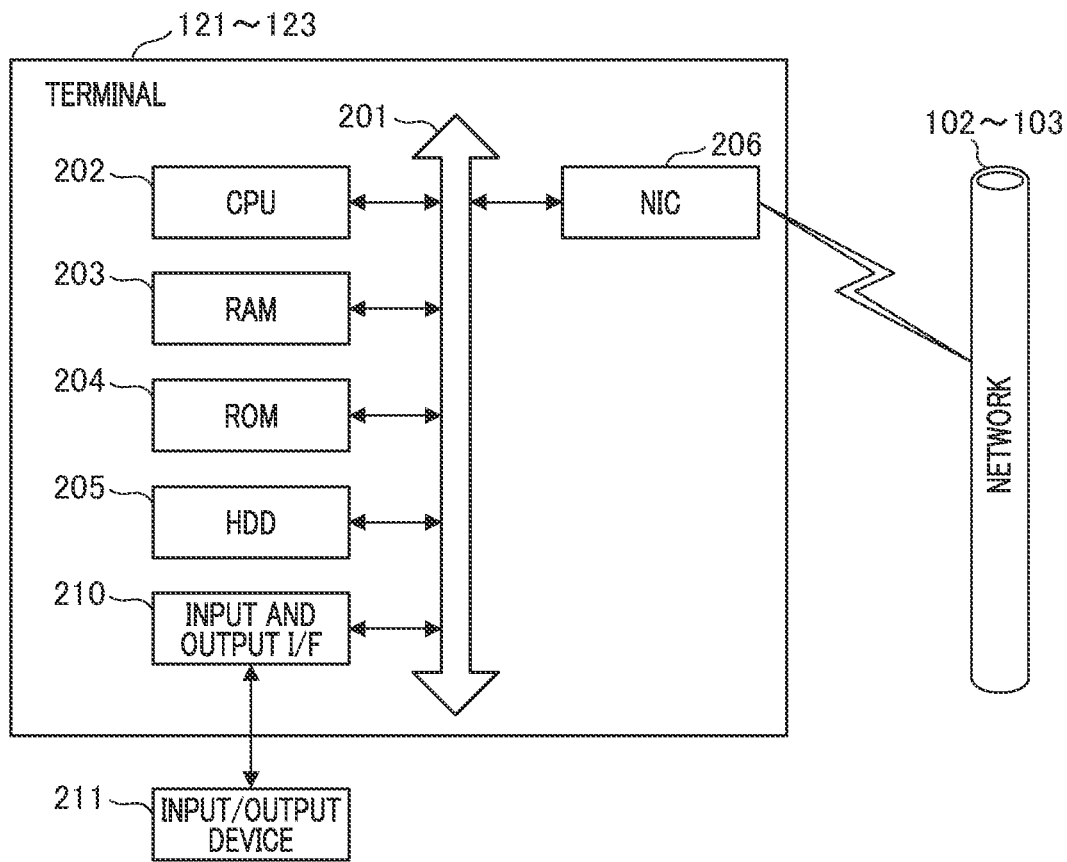
FIGS. 2A and 2B are diagrams illustrating a hardware configuration of a terminal and a hardware configuration of an authenticator.

FIG. 2A is a diagram illustrating a hardware configuration of each of the terminals 121 to 123. Each of the terminals 121 to 123 includes a central processing unit (CPU) 202, a random access memory (RAM) 203, a read only memory (ROM) 204, a hard disk drive (HDD) 205, an input and output I/F 210, a network interface card (NIC) 206. These elements are connected via a system bus 201 and exchange data.

The CPU 202 controls the terminal device as a whole. The CPU 202 executes a program such as an operating system (OS) or an application which is stored in the ROM 204 or the HDD 205. That is, the CPU 202 functions as functional units that perform processes in a flowchart which will be described later by executing a program stored in a readable storage medium.

The RAM 203 is a volatile memory area and is used as a temporary memory area or a work area when the CPU 202 performs various processes. The CPU 202 performs control such that information, a file, or the like required for executing a program is temporarily stored in the RAM 203. The ROM 204 is a nonvolatile memory area and stores various types of data such as an OS, a basic I/O program, and an application. The HDD 205 is one of an external storage means and functions as a large-capacity memory. The HDD 205 stores an application program such as a Web browser, programs of a service server group, an OS, relevant programs, and the like.

An input/output device 211 includes a plurality of elements taking charge of input and output in the terminals 121 to 123. Examples of the input device that receives a user's operation to the terminals 121 to 123 include a keyboard and a pointing device. Examples of the output device that displays a graphic user interface (GUI) or the like for the user include a liquid crystal display and a graphic controller. The input/output device 211 may be combined as a unified member such as a touch panel display. A GUI can be configured such that a user can directly operate a screen displayed on a touch panel by correlating input coordinates with display coordinates in the touch panel. The authenticators 131 to 134 which will be described later are also one type of input/output device 211 and can be connected to the terminals 121 to 123 via the input and output I/F 210.

The input and output I/F 210 controls an input and an output from the input/output device 211. Specifically, the input and output I/F 210 supplies a signal corresponding to an input from the input/output device 211 to the CPU 202 or the like. The input and output I/F 210 controls display on the input/output device 211. The input and output I/F 210 also functions as a communication I/F. That is, the input and output I/F 210 includes a communication interface for Bluetooth communication, USB connection, or an NFC.

The NIC 206 exchanges data with an external device such as the collaboration service server 111 connected to the networks 102 and 103 via the networks 102 and 103. The configuration of the terminals 121 to 123 is an example and the invention is not limited to the configuration example illustrated in FIG. 2A. For example, a storage destination of data or a program may be changed to the ROM 204, the RAM 203, the HDD 205, and the like according to features thereof.

Figure 2B:
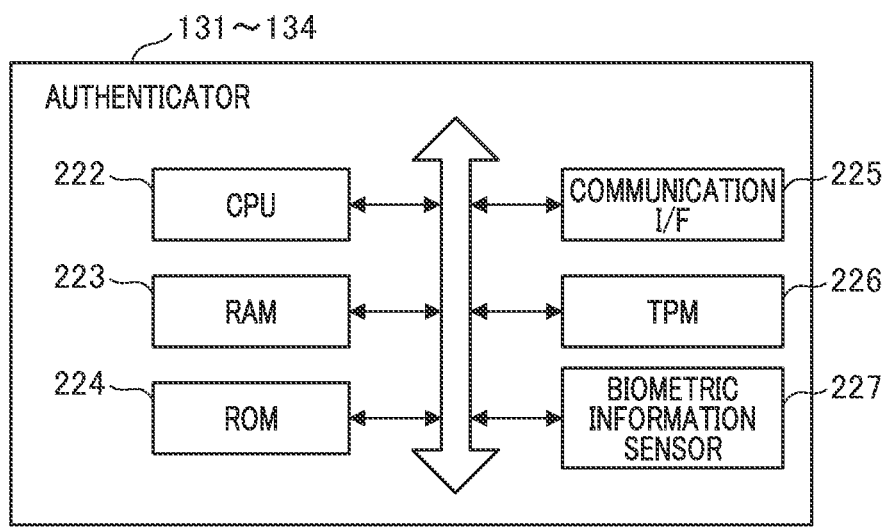

FIG. 2B is a diagram illustrating a hardware configuration of each of the authenticators 131 to 134. Each of the authenticators 131 to 134 includes a CPU 222, a RAM 223, a ROM 224, a communication I/F 225, a tamper module (TPM) 226, and a biometric information sensor 227. These elements are connected via a system bus 221 and exchange data.

The CPU 222 comprehensively controls the corresponding authenticator. The CPU 222 executes a program such as an application stored in the ROM 224. That is, the CPU 222 functions as various processing units that perform the processes in the flowcharts which will be described later by executing a program stored in a readable storage medium.

The RAM 223 is a volatile memory area and is used as a temporary memory area or a work area when the CPU 222 performs various processes. The CPU 222 performs control such that information, a file, or the like required for executing a program is temporarily stored in the RAM 223. The ROM 224 is a nonvolatile memory area and stores various types of data such as a basic I/O program and an application.

The communication I/F 225 performs data communication with the devices such as the terminals 121 to 123 corresponding to connection means such as Bluetooth communication, NFC, or USB using the connection means. The TPM 226 is a storage means for the purpose of processing or storing secret information having tamper resistance for preventing stored data from being read from the outside. In this embodiment, feature values of biometric information which are used for authentication or a private key which will be described later is stored in the TPM 226.

The biometric information sensor 227 is a sensor that reads a user's biometric information. The biometric information sensor 227 reads biometric information such as a user's fingerprint, iris, or vein and converts the read biometric information to a signal. The biometric information is not limited thereto. In this embodiment, the biometric information sensor 227 which is a fingerprint reading sensor acquires fingerprint information as the biometric information, but the invention is not limited thereto. For example, the biometric information sensor 227 may be another biometric information sensor such as a camera for reading an iris.

Figure 3:
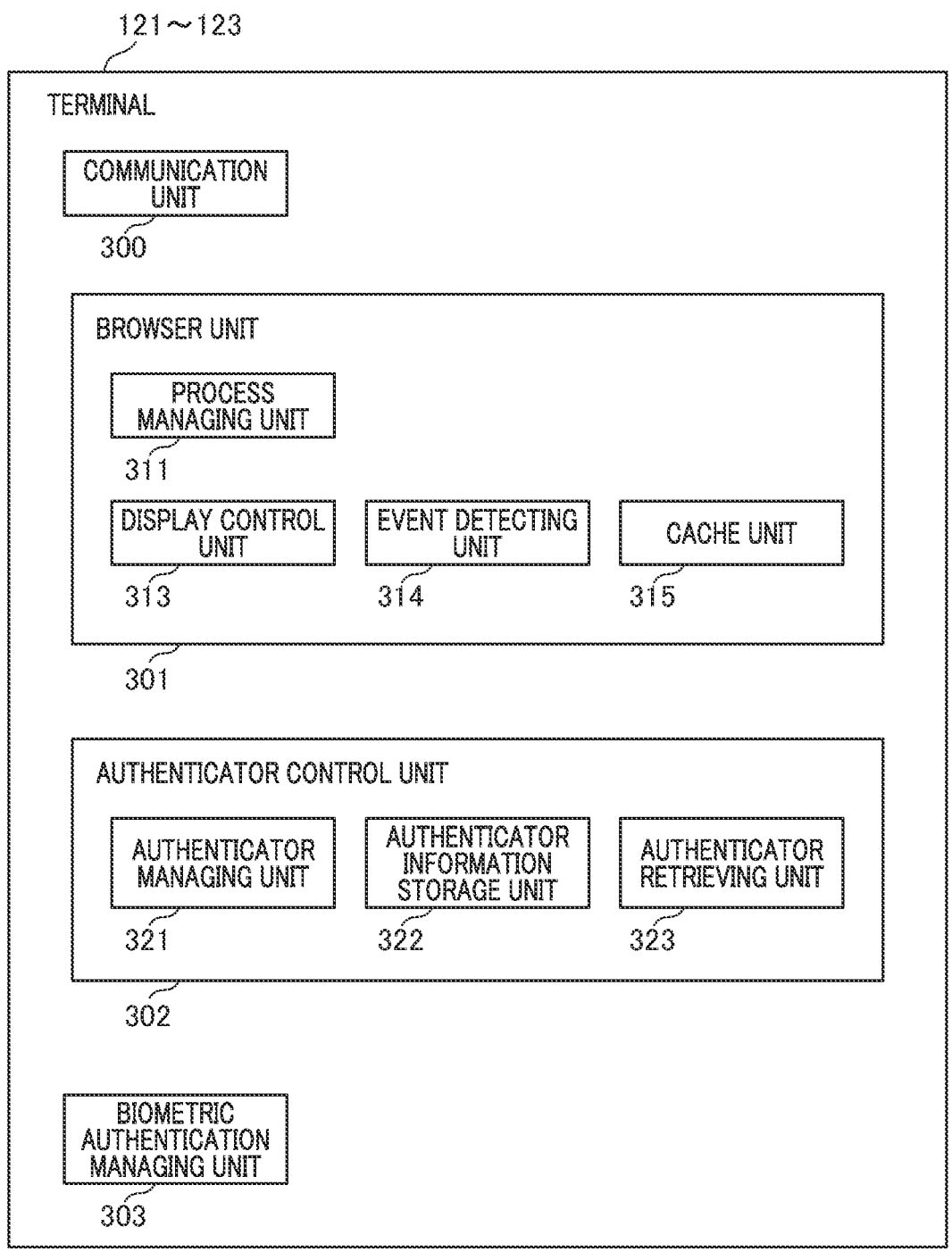
FIG. 3 is a diagram illustrating a software configuration of a terminal.

Functions which are provided by the terminals 121 to 123 will be described below with reference to FIGS. 3 and 4. FIG. 3 is a diagram illustrating a software configuration of each of the terminals 121 to 123. Reference signs 301, 302, and 303 illustrated in FIG. 3 denote software constituents, which are stored as programs in the HDD 205 described above with reference to FIG. 2A and are loaded to the RAM 203 and executed by the CPU 202 at the time of execution.

Each of the terminals 121 to 123 has functions such as a communication unit 300, a browser unit 301, an authenticator control unit 302, and a biometric authentication managing unit 303. The communication unit 300, the authenticator control unit 302, and the biometric authentication managing unit 303 are functions which are provided by an OS operating in the terminals 121 to 123. In this embodiment, the biometric authentication managing unit 303 is described as being a function which is provided by the OS, but may be one function which is provided by the browser unit 301. The communication unit 300 communicates with the outside such as collaboration service 112 via the NIC 206 in response to a request from the browser unit 301.

The browser unit 301 is, for example, an application that operates in the terminals 121 to 123 to use various functions of the collaboration service 112. A user accesses the collaboration service 112 using the browser unit 301 and uses various functions of the collaboration service 112 via a Web application which is provided by the collaboration service 112. The browser unit 301 includes a process managing unit 311, a display control unit 313, an event detecting unit 314, and a cache unit 315.

The process managing unit 311 controls all the processes for transmitting a request to the collaboration service 112 via the communication unit 300 or communicating with the authenticators 131 to 134 via the biometric authentication managing unit 303. The display control unit 313 provides an application screen such as a log-in screen to the collaboration service 112 to a user on the basis of a response acquired from the collaboration service 112 via the communication unit 300. The event detecting unit 314 receives an input from the input/output device 211 such as a mouse or a keyboard connected to the terminals 121 to 123 and notifies the process managing unit 311 of the received input. The cache unit 315 stores log-in information (for example, a user ID or a session ID) for the collaboration service 112 or cache information (for example, cookie information) such as access dates and times.

The authenticator control unit 302 includes an authenticator managing unit 321, an authenticator information storage unit 322, and an authenticator retrieving unit 323. The authenticator retrieving unit 323 retrieves an unconnected authenticator out of the authenticators 131 to 134 corresponding to the terminals 121 to 123 in response to a request from the authenticator managing unit 321. The authenticator information storage unit 322 stores authenticator information. The authentication information includes information of the authenticators 131 to 134 corresponding to the terminals 121 to 123 and information required for communication with the authenticators 131 to 134.

An example of the authenticator information stored in the authenticator information storage unit 322 is illustrated in Table 1.

TABLE 1

| Authenticator ID | Connection method | Connection ID |
|---|---|---|
| abc | bluetooth | N/A |
| xyz | USE | Port 1 |

The authenticator information includes, for example, an authenticator ID, a connection method, and a connection ID. The authenticator ID is information for uniquely identifying the authenticators 131 to 134. The connection method is information indicating connection methods between the terminals 121 to 123 and the authenticators 131 to 134. For example, information such as Bluetooth, USB, or NFC is stored as the connection method. The connection ID is information for uniquely identifying connection when the authenticators 131 to 134 are connected to the terminals 121 to 123. The connection ID is, for example, a port identifier of a USB for an authenticator connected to the USB and a session ID of Bluetooth connection for an authenticator paired using Bluetooth. The connection method may be acquired with reference to a handle which is provided by an OS or the like. The connection ID when the corresponding authenticator is not connected is N/A (Not Applicable). For example, an authenticator of which the authenticator ID is identified by abc has a connection method of Bluetooth and a connection ID of N/A because it is not currently paired. On the other hand, an authenticator of which the authenticator ID is identified by xyz has a connection method of USB and a connection ID of port 1 indicating that it is currently connected to port 1. In this embodiment, the authenticator information storage unit 322 that collectively manages the authenticators regardless of the connection method is provided, but the authenticators may be managed in different tables according to the connection methods.

The authenticator managing unit 321 returns information of the authenticators 131 to 134 in response to a request from the biometric authentication managing unit 303 or transmits a biometric authentication request to the authenticators 131 to 134 designated by the biometric authentication managing unit 303 and returns a biometric authentication result to the biometric authentication managing unit 303. The authenticator managing unit 321 acquires information required for communication from the authenticator information storage unit 322 and performs communication at the time of communication with the authenticators 131 to 134.

The biometric authentication managing unit 303 manages biometric authentication for the collaboration service 112 by communicating with the collaboration service 112 or exchanging data with the authenticator managing unit 321 of the authenticator control unit 302.

Figure 4:
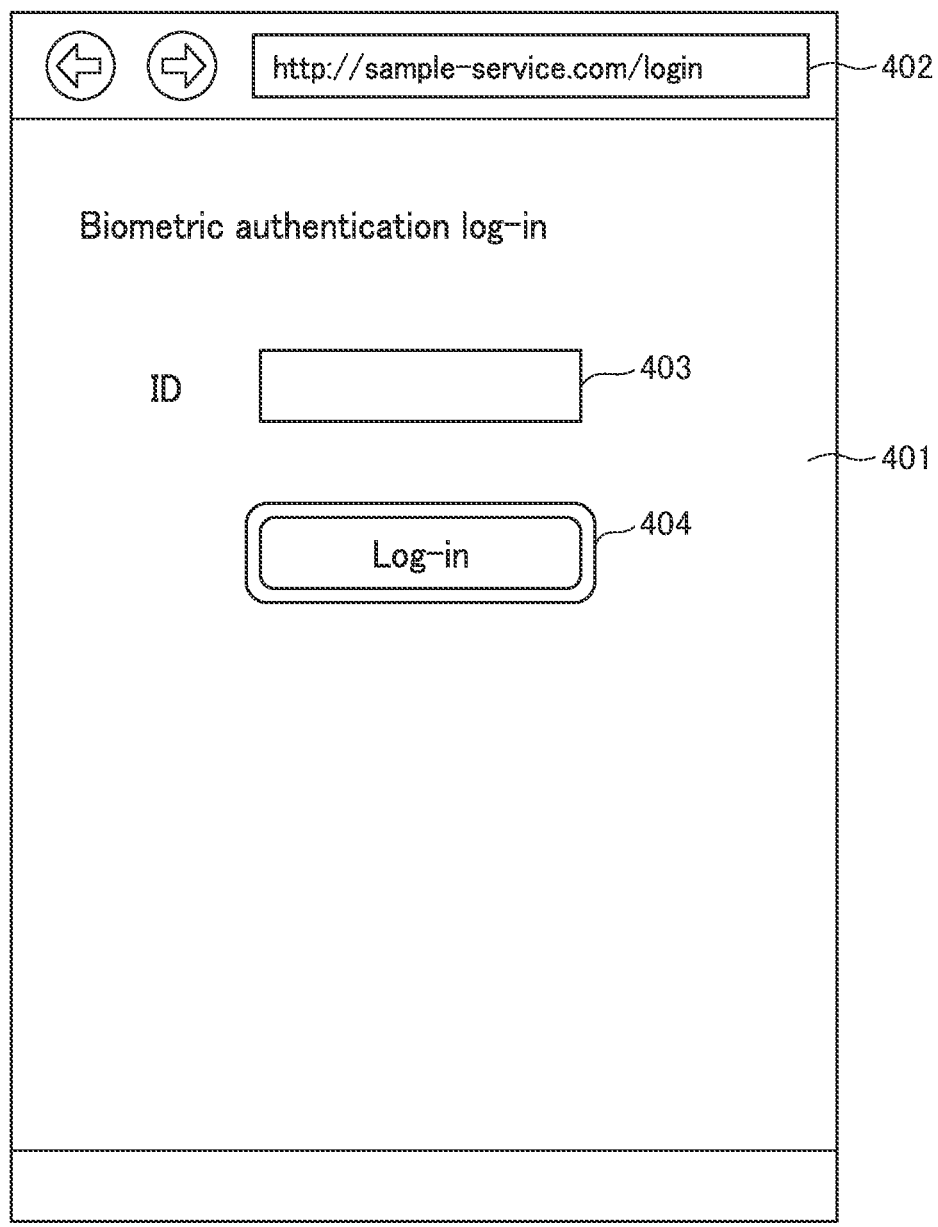
FIG. 4 is a diagram illustrating an example of a log-in screen.

FIG. 4 illustrates a biometric authentication log-in screen 401 of the collaboration service 112. The biometric authentication log-in screen 401 is a browser screen which is displayed on a display unit of the input/output device 211 by the browser unit 301 and which is used to receive an instruction for log-in to a service provided by the collaboration service 112 from a user. An URL bar 402, an ID 403, and a log-in button 404 are displayed in the biometric authentication log-in screen 401. An URL of a page which is currently displayed is displayed in the URL bar 402. An URL of the biometric authentication log-in screen is displayed in the URL bar 402 of the biometric authentication log-in screen 401. The biometric authentication log-in screen 401 may be displayed at the time of log-in to a service (for example, an application) which is provided by the collaboration service 112 or may be displayed when a user inputs a log-in URL of the collaboration service 112 to the URL bar. The display control unit 313 of the browser unit 301 analyzes a response from the collaboration service 112 in response to a request for displaying a log-in screen from the user and displays the biometric authentication log-in screen 401.

The ID 403 is a text box for allowing a user to input a user ID. The log-in button 404 is an icon for allowing a user to transmit an authentication request to the collaboration service 112. A user transmits the authentication request to the collaboration service 112 by inputting the user ID for the collaboration service 112 to the text box of the ID 403 and clicking the log-in button 404. When a user ID which was input in the past to the text box of the ID 403 is stored in the cache unit 315, the user may transmit an authentication request to the collaboration service 112 at a time point at which the biometric authentication log-in screen 401 is displayed. A detailed biometric authentication flow including the authenticators 131 to 134 will be described below.

A flow of allowing a user to log into the collaboration service 112 will be described below with reference to FIGS. 5 to 7. In this embodiment, challenge-response authentication is used as a method of allowing a user to log into the collaboration service 112. In the challenge-response authentication, first, when the collaboration service 112 is accessed and a log-in page which is provided by the collaboration service 112 is displayed on a browser, the terminals 121 to 123 request verification data including a challenge from the collaboration service 112. The challenge is a parameter which is used for challenge-response authentication. A random number or the like is used as the challenge and a preparation method thereof is not particularly limited. The collaboration service 112 from which verification data has been requested returns verification data including the challenge as a response to the terminals 121 to 123. The browser unit 301 signs the challenge included in the response from the collaboration service 112 using a private key which is stored in the authenticators 131 to 134 in correlation with the user's biometric information and transmits the signature to the collaboration service 112. The collaboration service 112 authenticates the signature transmitted from the browser unit 301 on the basis of a result of verification using a registered public key corresponding to the user. In this embodiment, description of a process of storing a private key in the authenticators 131 to 134 in correlation with the user's biometric information and a process of registering the corresponding public key in the collaboration service 112 will be omitted.

When biometric authentication is performed in log-in to the collaboration service 112, a process of acquiring a challenge from the collaboration service 112 or a process of acquiring a list of authenticators which are connected or located near are necessary and thus a time is required for completion of authentication. Particularly, when authenticators which are located near are retrieved, several seconds to ten seconds can be considered to be required in some cases and thus a user may feel discomfort due to a processing delay. Therefore, in this embodiment, by performing processes required for biometric authentication as preparation processes while an instruction for log-in from a user is being waited for, it is possible to shorten the time required from the instruction for log-in to the completion of biometric authentication.

Figure 5:
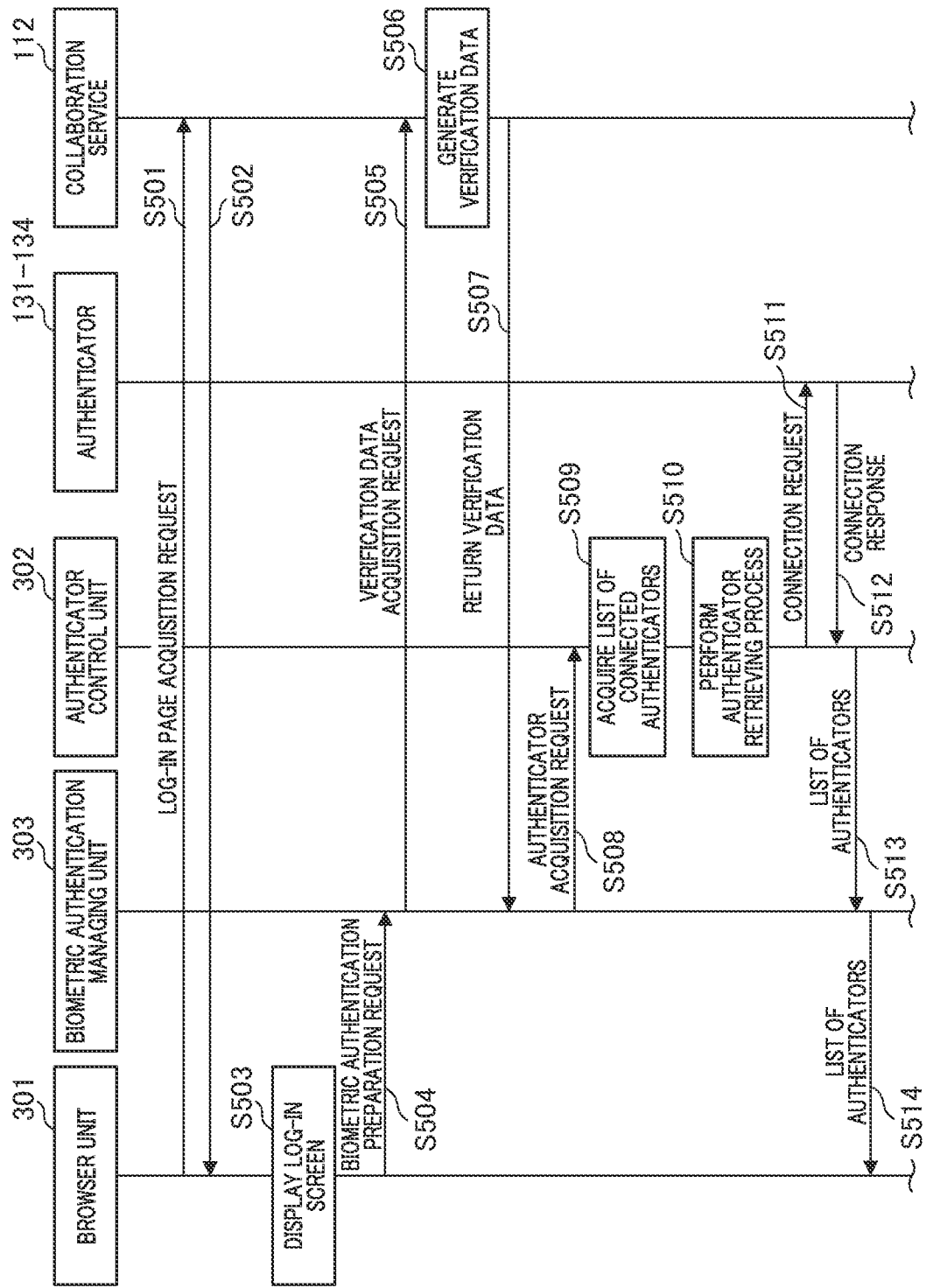
FIG. 5 is a sequence diagram illustrating biometric authentication.
Figure 6:
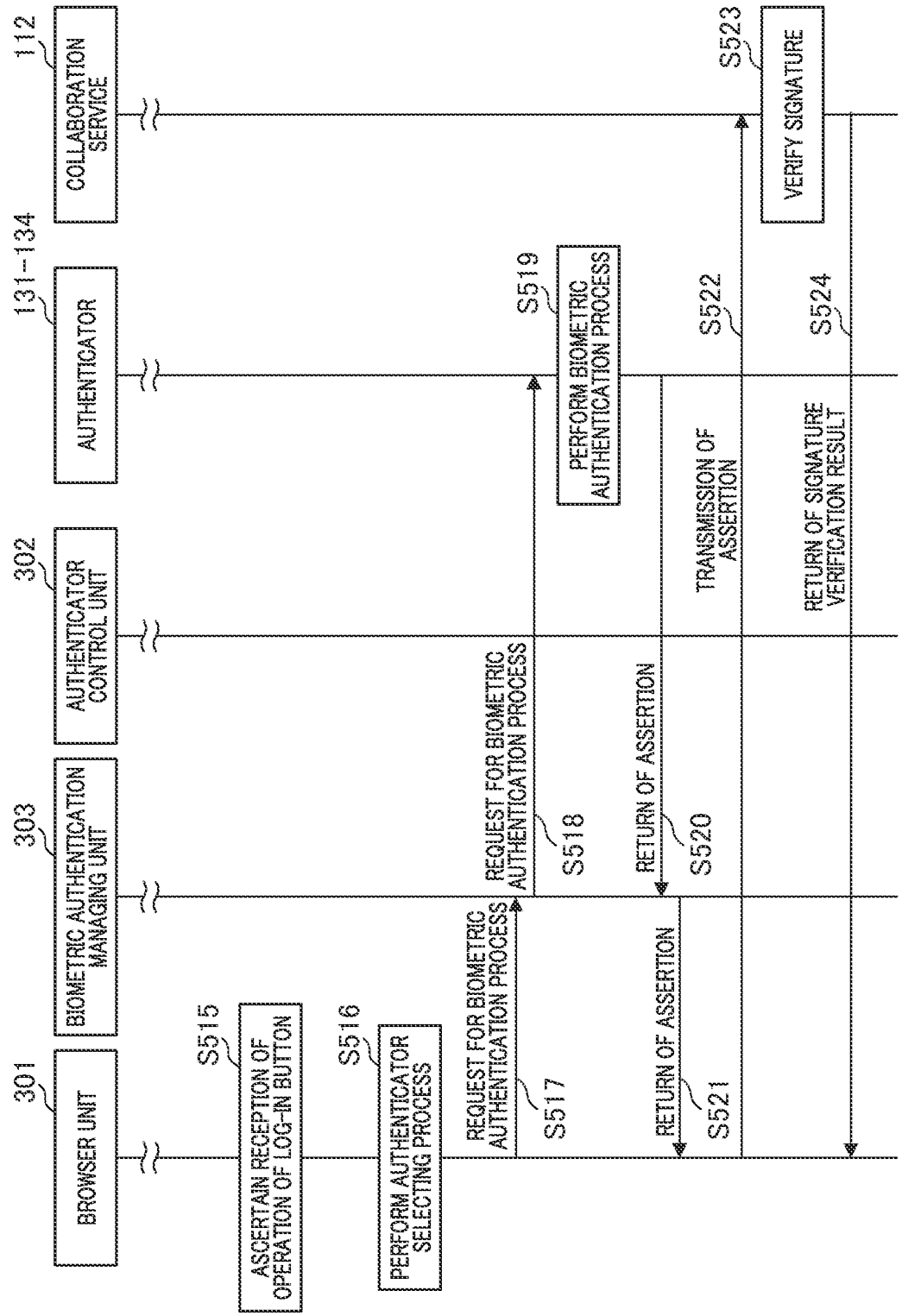
FIG. 6 is a sequence diagram illustrating biometric authentication.

FIGS. 5 and 6 are sequence diagrams illustrating a flow of processes of logging into the collaboration service 112. In this embodiment, a process of shortening a time required for a user's biometric authentication using an asynchronous process on the basis of the premise that a user ID which was used in the past is stored (cached) in the cache unit 315 will be described below. In the following description, a flow of processes of logging into the collaboration service 112 by allowing a user to operate the terminal 121 will be described, and the same is true of a log-in process in the terminal 122 and the terminal 123.

In Step S501, the process managing unit 311 accesses the collaboration service 112 via the communication unit 300 and sends a log-in page acquisition request. The log-in page acquisition request is sent, for example, by causing the event detecting unit 314 to detect that a user has input an URL of a log-in page to the collaboration service 112 to the URL bar 402 on the browser and to notify the process managing unit 311 of the input URL.

In Step S502, the collaboration service 112 having received the log-in page acquisition request from the terminal 121 returns contents corresponding to the log-in page to the terminal 121 as a response to the log-in page acquisition request. When contents corresponding to the log-in page are received via the communication unit 300, the process managing unit 311 of the terminal 121 sends the received contents to the display control unit 313. In Step S503, the display control unit 313 presents the biometric authentication log-in screen 401 on the browser to the user by displaying the biometric authentication log-in screen 401 on the input/output device 211.

In this embodiment, in order to shorten the time required for processes after biometric authentication has been requested, a biometric authentication preparing process which is an asynchronous process is performed without waiting for a biometric authentication request from the user (the user's operation of the log-in button 404 (S515)). That is, the biometric authentication preparing process is performed in Steps S504 to S514 before the user's operation of the log-in button 404 is received in Step S515. In this embodiment, the biometric authentication preparing process includes a process of transmitting a request for verification data for challenge-response authentication to the collaboration service 112 and a communication process for connection to an external authenticator.

In Step S504, the process managing unit 311 requests the biometric authentication preparing process which is an asynchronous process from the biometric authentication managing unit 303. The request for the biometric authentication preparing process includes information of a user ID of the user who is performing biometric authentication. The user ID included in the request for the biometric authentication preparing process is a user ID which is stored in the cache unit 315. Specifically, first, when the biometric authentication log-in screen 401 is displayed on the input/output device 211, the event detecting unit 314 notifies the process managing unit 311 that the biometric authentication log-in screen 401 is displayed. The process managing unit 311 having been notified acquires information of the user ID for the collaboration service 112 which has been previously input to the ID 403 of the displayed biometric authentication log-in screen 401 from the cache unit 315. Then, in Step S504, the process managing unit 311 requests the biometric authentication preparing process using the user ID acquired from the cache unit 315 from the biometric authentication managing unit 303.

In Step S505, the biometric authentication managing unit 303 transmits an acquisition request for verification data to the collaboration service 112 via the communication unit 300 (a first transmission means). The verification data which the biometric authentication managing unit 303 requests from the collaboration service 112 is a biometric authentication parameter. The biometric authentication parameters include a challenge for challenge-response authentication.

In Step S506, the collaboration service 112 having received the acquisition request for verification data generates verification data as the verification data. In Step S507, the collaboration service 112 returns the generated verification data as a response to the biometric authentication managing unit 303. The verification data which the biometric authentication managing unit 303 acquires from the collaboration service 112 includes a challenge for challenge-response authentication.

In Step S508, the biometric authentication managing unit 303 transmits an authenticator acquisition request to the authenticator managing unit 321. In Step S509, the authenticator managing unit 321 acquires a list of connected external authenticators from the authenticator information storage unit 322. That is, the authenticator managing unit 321 acquires a list of authenticators 131 to 134 which are connected to the terminals 121 to 123 by USB or paired by Bluetooth or by NFC.

In Step S510, the authenticator managing unit 321 requests the authenticator retrieving unit 323 to perform a process of retrieving authenticators which are located nearby and the authenticator retrieving unit 323 performs the authenticator retrieving process. In Step S511, the authenticator managing unit 321 transmits a connection request to an unconnected authenticator out of the authenticators retrieved in Step S510. When a plurality of unconnected authenticators are retrieved in Step S510, the authenticator managing unit 321 transmits a connection request to all the retrieved unconnected authenticators.

An external authenticator having received the connection request from the terminal 121 transmits a response to the terminal 121 and is connected to the terminal 121 in Step S512. The authenticator retrieving process (Step S510) and the connection process based on the result of retrieval (Steps S511 and S512) do not have to be performed. For example, whether the authenticator retrieving process is to be performed may be determined on the basis of the biometric authentication parameter received from the collaboration service 112 in Step S506 or may be performed only when there are no connected authenticators in Step S509. As described above in Steps S508 to S512, the authenticator managing unit 321 communicates with an external authenticator before authenticating the user (a communication control means).

In Steps S513 and S514, the authenticator managing unit 321 sends a list of connected authenticators to the process managing unit 311 of the browser unit 301 via the biometric authentication managing unit 303. Specifically, in Step S513, the authenticator managing unit 321 sends the list of connected authenticators acquired in Step S509 and the list of authenticators successfully connected in Step S511 as the list of connected authenticators to the biometric authentication managing unit 303. In Step S514, the biometric authentication managing unit 303 sends the list of connected authenticators acquired in Step S509 and the list of authenticators successfully connected in Step S511 as the list of connected authenticators to the process managing unit 311. In this embodiment, the list of connected authenticators acquired in Step S509 and the list of authenticators successfully connected in Step S511 are sent as the list of connected authenticators, but the list of all the connected authenticators does not have to be sent. For example, only the list of connected authenticators acquired in Step S509 may be sent or only a list of authenticators connected by a specific connection method may be set.

In Step S515, the process managing unit 311 receives a log-in instruction for the collaboration service 112 (for example, a user's operation of the log-in button 404) from the user. Here, the biometric authentication preparing process of Steps S504 to S514 is an asynchronous process which is performed without waiting for a log-in instruction. That is, without waiting for an operation of the log-in button 404 (Step S515), a challenge required for biometric authentication is acquired and communication with the authenticators 131 to 134 is performed. By performing the biometric authentication preparing process as an asynchronous process in this way, the processes of Step S516 and steps subsequent thereto can be performed immediately after the user pushes the log-in button 404, and the biometric authentication process can be performed with a shortened time for causing the user to wait.

In this embodiment, both the process of transmitting a request for verification data for challenge-response authentication to the collaboration service 112 and the process of communicating with an external authenticator for connection are performed as the biometric authentication preparing process without waiting for a log-in instruction from the user. However, the invention is not limited thereto and any one process can be performed as the biometric authentication preparing process before a log-in instruction from the user is input. Accordingly, it is possible to shorten a time associated with biometric authentication. At this time, when a process which has not been performed before the log-in instruction is input from the user remains, the process can be performed immediately after the log-in instruction is input from the user.

When there are a plurality of connected authenticators included in the response from the biometric authentication managing unit 303 in Step S514, the process managing unit 311 selects an authenticator which is used for biometric authentication out of the connected authenticators in Step S516. The authenticator may be selected by the user or may be selected automatically. When the authenticator is selected by the user, the process managing unit 311 displays a selection screen for allowing a user to select an authenticator which is used for biometric authentication from the list of connected authenticators on the input/output device 211 and receives a selection from the user. The display control unit 313 displays the selection screen on the input/output device 211 on the basis of information of the list of connected authenticators included in the response from the biometric authentication managing unit 303 in Step S514. When the authenticator is selected automatically, the authenticator which is used for biometric authentication is selected without causing the user to select the authenticator every time, for example, by selecting the authenticator which was previously selected, selecting the authenticator connected by a specific connection method, or the like. When the number of connected authenticators included in the response from the biometric authentication managing unit 303 in Step S514 is one, this step is skipped.

In Steps S517 and S518, the process managing unit 311 requests a biometric authentication process from the authenticator selected in Step S516 (a second transmission means). In other words, the biometric authentication process request is a request for an assertion based on the biometric authentication process. Here, the assertion is signature data which is prepared using a private key which is specified from biometric information when authentication has succeeded and the challenge (verification data in this embodiment) by the authenticator that performs biometric authentication. Specifically, first, in Step S517, the process managing unit 311 requests the biometric authentication managing unit 303 to perform a biometric authentication process. Then, in Step S518, the biometric authentication managing unit 303 transmits a request for the biometric authentication process to the authenticator selected in Step S516. The request for the biometric authentication process includes verification data including a challenge which is acquired in the biometric authentication preparing process and which is generated by the collaboration service 112 in Step S506.

The authenticator having received the request for the biometric authentication process performs the biometric authentication process in Step S519. The biometric authentication process is a process of signing the verification data included in the request for the biometric authentication process using a private key correlated with biometric information which is input by receiving an input of biometric information from the user and generating signature data (that is, an assertion). The authenticator performs the biometric authentication process and generates signature data, which is prepared using the private key specified when the biometric authentication has succeeded and the verification data received in Step S518, when authentication based on the biometric information acquired from the user such as a fingerprint has succeeded.

In Steps S520 and S521, the authenticator returns an assertion (signature data) generated in Step S519 to the process managing unit 311 which is a request source of the assertion via the biometric authentication managing unit 303 (a third transmission means). Specifically, in Step S520, the authenticator transmits the assertion which is the signature data prepared using the private key specified when the biometric authentication has succeeded and the verification data to the biometric authentication managing unit 303. Then, in Step S521, the biometric authentication managing unit 303 sends the assertion received from the authenticator to the process managing unit 311.

In Step S522, the process managing unit 311 transmits the assertion received in Step S521 to the collaboration service 112 via the communication unit 300. The collaboration service 112 having received the assertion verifies the signature data in Step S523. The collaboration service 112 decrypts the signature using a registered public key corresponding to the user who has transmitted the acquisition request for a biometric authentication parameter in Step S505, and performs signature verification of determining whether the decrypted result is correct. In Step S524, the collaboration service 112 returns a result of signature verification in Step S523 as a response to the process managing unit 311.

Figure 7:
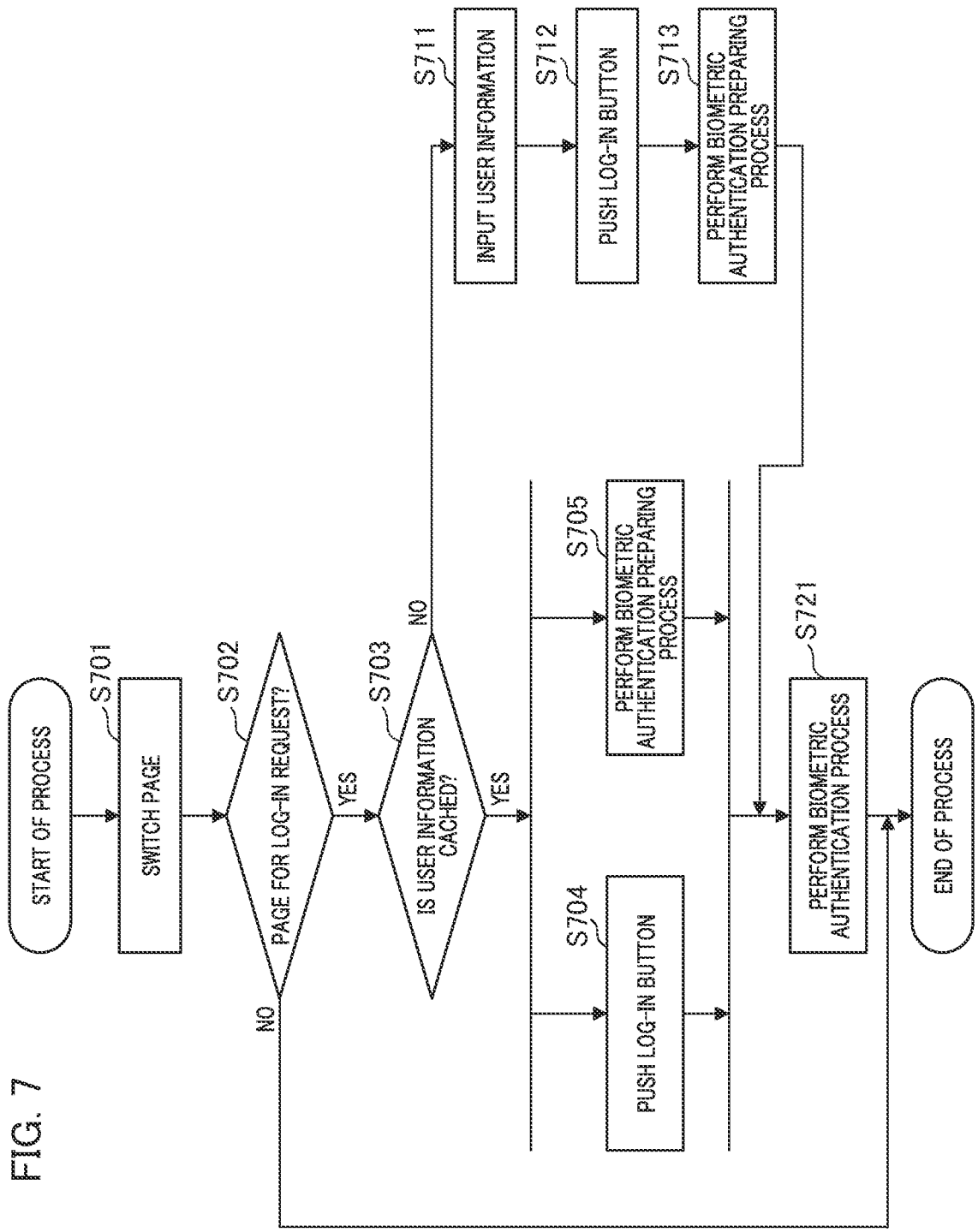
FIG. 7 is a flowchart illustrating biometric authentication according to a first embodiment.

FIG. 7 is a flowchart illustrating a flow of an authentication process when a user accesses the collaboration service 112 using the terminal 121. In Step S701 after having accessed the collaboration service 112, the event detecting unit 314 notifies the process managing unit 311 that a page is switched when the display control unit 313 detects switching of the displayed page.

In Step S702, the process managing unit 311 determines whether the switched page is a page requiring log-in. An example of the page requiring log-in is the biometric authentication log-in screen 401 of the collaboration service 112 illustrated in FIG. 4. When it is determined that the page does not require log-in, the process managing unit 311 ends this process flow. On the other hand, when it is determined that the page requires log-in, the process flow proceeds to Step S703.

In Step S703, the process managing unit 311 determines whether user information for log-in to the collaboration service 112 such as a user ID is cached in the cache unit 315. When the user information for log-in is cached, the process flow proceeds to Steps S704 and S705. On the other hand, when the user information for log-in is not cached, the process flow proceeds to Step S711.

A case in which the user information for log-in is not cached will be described first. In Step S711, the process managing unit 311 receives an input of user information for log-in in the page requiring log-in from the user. For example, a user ID is input to the ID 403 on the biometric authentication log-in screen 401. When the user inputs an instruction for log-in (pushes the log-in button 404), the event detecting unit 314 detects that the log-in button 404 is pushed and notifies the process managing unit 311 of it in Step S712. In Step S713, the process managing unit 311 performs the biometric authentication preparing process on the basis of the user ID input to the ID 403. Here, the biometric authentication preparing process includes the process of transmitting a request for verification data for challenge-response authentication to the collaboration service 112 and the process of communicating with an external authenticator for connection thereto, which are illustrated in Steps S504 to S514 of FIG. 5.

A case in which user information for log-in is cached will be described below. When the user information is cached, the cached user information is displayed in the ID 403 on the biometric authentication log-in screen 401. Steps S704 and S705 are asynchronous processes. In Step S704, the event detecting unit 314 detects that the log-in button 404 is pushed by the user and notifies the process managing unit 311 of it. The process managing unit 311 receives an instruction for log-in to the collaboration service 112 from the user. Push of the log-in button 404 by the user is performed at an arbitrary timing.

Without waiting for the instruction for log-in in Step S704, the process managing unit 311 performs the biometric authentication preparing process using the cached user information in Step S705. Here, the biometric authentication preparing process includes the process of transmitting a request for verification data for challenge-response authentication to the collaboration service 112 and the process of communicating with an external authenticator for connection thereto, which are illustrated in Steps S504 to S514 of FIG. 5. At this time, in the acquisition request for verification data in Step S505, a request for verification data based on the cached user information is transmitted to the collaboration service 112.

When the biometric authentication preparing process is completed and the push of the log-in button 404 is detected, the process managing unit 311 performs a biometric authentication process in Step S721. The biometric authentication process corresponds to Steps S516 to S524 in FIG. 6.

The authenticators 131 to 134 in this embodiment are external authenticators connected to the terminals 121 to 123, but may be incorporated into the terminals 121 to 123. The biometric authentication method is described as an authentication method, but a method not using biometric authentication such as password authentication using an external authenticator or authentication using PIN may be performed.

Through the aforementioned processes, it is possible to shorten a time from an instruction for log-in to completion of biometric authentication by performing a preparation process required for biometric authentication until an instruction for log-in is received from a user after a log-in screen has been displayed.

Second Embodiment

In the first embodiment, a process of communicating with an authenticator is performed after verification data has been acquired, but these processes do not have to be performed sequentially. In a second embodiment, an example in which the process of acquiring verification data and the process of communicating with an authenticator are performed in parallel (asynchronously) will be described.

Figure 8:
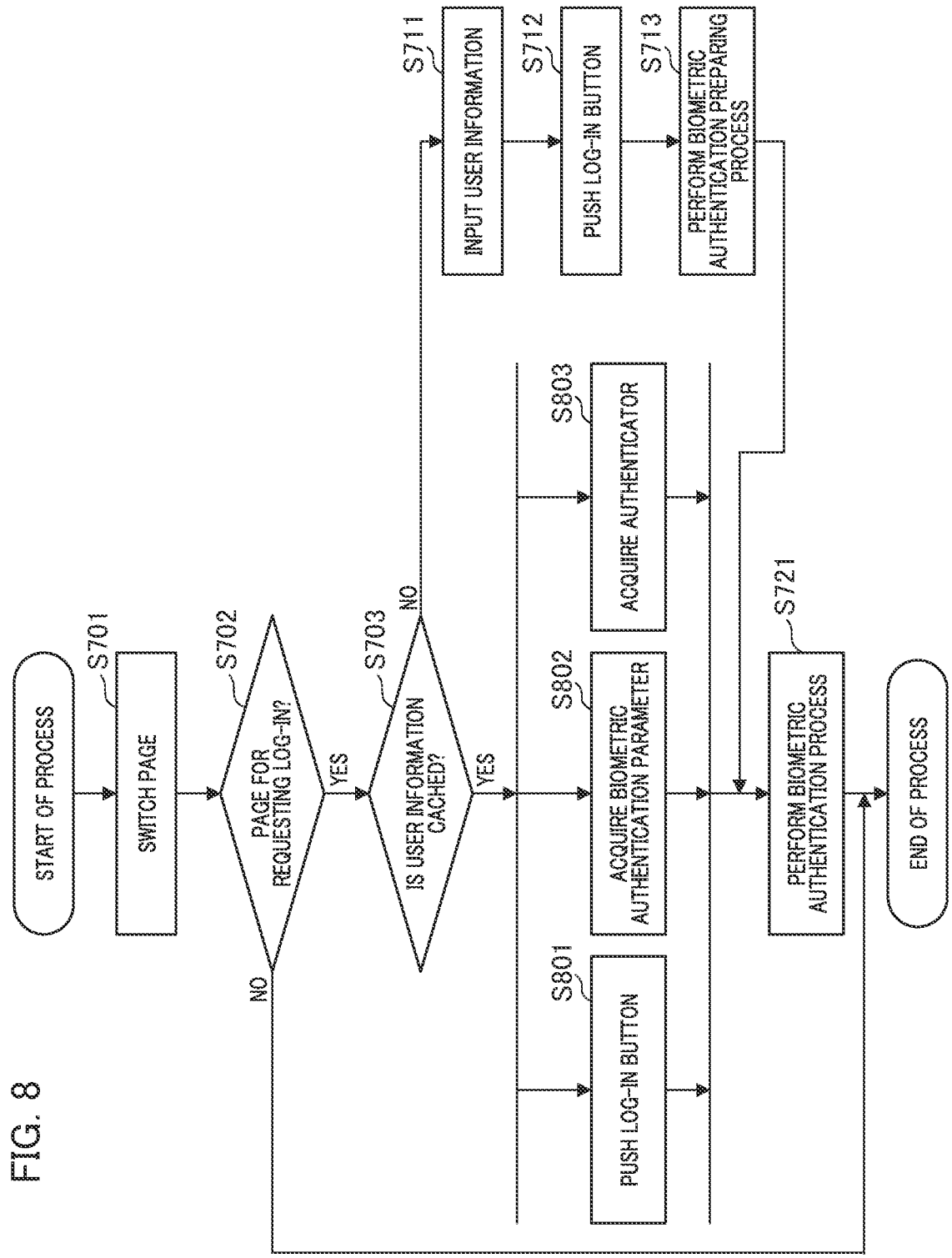
FIG. 8 is a flowchart illustrating biometric authentication according to a second embodiment.

FIG. 8 is a flowchart illustrating a flow of processes when a user accesses the collaboration service 112 using the terminal 121 according to the second embodiment. This flowchart is different from the flowchart according to the first embodiment illustrated in FIG. 7 in only a process when log-in information is cached in the cache unit 315 in Step S703. The same steps as in the first embodiment will be referred to by the same reference signs and description thereof will be omitted.

When user information is cached, the cached user information is displayed in the ID 403 on the biometric authentication log-in screen 401. Then, the processes of Steps S801 to S803 are asynchronously performed in parallel. In Step S801, the event detecting unit 314 detects that the log-in button 404 is pushed by the user and notifies the process managing unit 311 of an instruction for log-in. In response to this notification, the process managing unit 311 receives an instruction for log-in to the collaboration service 112 from the user. The push of the log-in button 404 by the user is performed at an arbitrary timing.

Steps S802 and S803 are biometric authentication preparing processes which are performed in parallel without waiting for an instruction for log-in in Step S801. Step S802 is a process of transmitting a request for verification data for challenge-response authentication to the collaboration service 112, which is illustrated in Steps S504 to S507 of FIG. 5. The process managing unit 311 requests verification data using the cached user information. Step S803 is a process of communicating with an external authenticator for connection thereto, which is illustrated in Steps S508 to S514 of FIG. 5.

When the processes of Steps S801 to S803 are completed, the process managing unit 311 performs the biometric authentication process of Step S721. In the second embodiment, Steps S801 to S803 are performed in parallel, but, for example, Steps S801 and S802 and Step S803 may be performed in parallel or Steps S801 and S803 and Step S802 may be performed in parallel. By performing these processes in parallel, it is possible to further shorten a time required from a request for log-in to completion of biometric authentication in comparison with a case in which Steps S801 to S803 are performed sequentially.

As described above, according to this embodiment, it is possible to further shorten a time required from a request for log-in to a service to completion of biometric authentication by performing a process of acquiring verification information and a process of communication with an external server which are performed as a biometric authentication preparing process in parallel.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing device that is able to communicate with an external authenticator that authenticates a user, the information processing device comprising:
    at least one memory storing computer-executable instructions and
    one or more processors configured to execute the computer-executable instructions, which, when executed by the one or more processors, cause the information processing device to:
        display a log-in screen for receiving an instruction for log-in to a service which is provided by a service provider system from the user after accessing the service provider system;
        transmit an acquisition request for verification data to the service provider system;
        communicate with the external authenticator;
        transmit an authentication request including the verification data to the communicating external authenticator when the instruction for log-in is received from the user via the log-in screen, wherein the external authenticator that receives the authentication request performs authentication based on biometric data; and
        transmit signature data, which is prepared using a private key which is identified when the authentication of the user has succeeded, and the verification data, to the service provider system when the signature data is received from the external authenticator,
    wherein at least one of the following is performed: (1) (a) transmission of the acquisition request to the service provider system and (b) communication with the external authenticator is performed without waiting until the instruction for log-in is received from the user via the log-in screen after accessing the service provider system, or (2) (a) transmission of the acquisition request to the service provider system and (b) communication with the external authenticator is performed asynchronously with the instruction for log-in.

2. The information processing device according to claim 1, wherein transmission of the acquisition request to the service provider system based on user information for log-in is performed without waiting until the instruction for log-in is received from the user via the log-in screen after accessing the service provider system when the user information is cached.

3. The information processing device according to claim 1, wherein the computer-executable instructions further cause the information processing device to select an external authenticator which is used for authentication after the instruction for log-in is received from the user via the log-in screen if the information processing device communicates with a plurality of external authenticators, and
    wherein the authentication request including the verification data is transmitted to the selected external authenticator when the instruction for log-in is received via the log-in screen from the user.

4. The information processing device according to claim 3, wherein a list of available external authenticators is displayed and one external authenticator selected by the user from the list is selected as the external authenticator which is used for the authentication if the information processing device communicates with a plurality of external authenticators.

5. The information processing device according to claim 3, wherein an external authenticator having previously performed authentication is selected as the external authenticator which is used for the authentication.

6. The information processing device according to claim 1, wherein the service provider system verifies the signature data transmitted from the information processing device using a registered public key.

7. The information processing device according to claim 1, wherein communication with the external authenticator is performed using one of Bluetooth, USB, and NFC.

8. The information processing device according to claim 1, wherein transmission of the acquisition request to the service provider system and communication with the external authenticator are performed in parallel.

9. The information processing device according to claim 1, wherein the verification data includes a challenge to challenge-response authentication.

10. A control method for an information processing device that communicates with an external authenticator that authenticates a user, the method comprising:
    displaying a log-in screen for receiving an instruction for log-in to a service which is provided by a service provider system from the user after accessing the service provider system;
    transmitting an acquisition request for verification data to the service provider system;
    communicating with the external authenticator;
    transmitting an authentication request including the verification data to the communicating external authenticator when the instruction for log-in is received from the user via the log-in screen, wherein the external authenticator that receives the authentication request performs authentication based on biometric data; and
    transmitting signature data, which is prepared using a private key which is identified when the authentication of the user has succeeded, and the verification data, to the service provider system when the signature data is received from the external authenticator,
    wherein at least one of the following is performed: (1) (a) transmission of the acquisition request to the service provider system and (b) communication with the external authenticator is performed without waiting until the instruction for log-in is received from the user via the screen after accessing the service provider system, or (2) (a) transmission of the acquisition request to the service provider system and (b) communication with the external authenticator is performed asynchronously with the instruction for log-in.

11. A non-transitory storage medium on which is stored a computer program for making a computer of an information processing device perform operations comprising:
    displaying a log-in screen for receiving an instruction for log-in to a service which is provided by a service provider system from a user after accessing the service provider system;
    transmitting an acquisition request for verification data to the service provider system;
    communicating with the external authenticator;
    transmitting an authentication request including the verification data to the communicating external authenticator when the instruction for log-in is received from the user via the log-in screen, wherein the external authenticator that receives the authentication request performs authentication based on biometric data; and
    transmitting signature data, which is prepared using a private key which is identified when the authentication of the user has succeeded, and the verification data, to the service provider system when the signature data is received from the external authenticator, wherein at least one of the following is performed: (1) (a) transmission of the acquisition request to the service provider system and (b) communication with the external authenticator is performed without waiting until the instruction for log-in is received from the user via the screen after accessing the service provider system, or (2) (a) transmission of the acquisition request to the service provider system and (b) communication with the external authenticator is performed asynchronously with the instruction for log-in.

* * * * *